United States Patent Office 3,413,348
Patented Nov. 26, 1968

3,413,348
4-PHENYLBICYCLO[2.2.2]OCT-2-ENE-1-AMINE
AND SALTS THEREOF
Walter A. Gregory and James C. Kauer, Wilmington, Del., assignors to E. I. du Pont de Nemours and Company, Wilmington, Del., a corporation of Delaware
No Drawing. Filed June 28, 1965, Ser. No. 467,753
9 Claims. (Cl. 260—570.5)

This invention relates to substituted bicyclo[2.2.2]oct-2-enes. More particularly, this invention refers to novel 4-phenyl and 4-substituted phenyl bicyclo[2.2.2]oct-2-ene-1-amines and their use as antidepressants.

According to the present invention I have discovered a novel class of compounds which are useful in pharmaceutical applications. Particularly, they are antidepressant agents, as shown by their ability to antagonize tetrabenazine-induced sedation in mice, to potentiate the norepinephrine pressor effect in ganglion-blocked, anesthetized dogs, and to antagonize the phenethylamine pressor effect in ganglion-blocked, anesthetized dogs.

The compounds of this invention have the formula

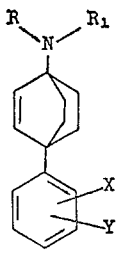

where:

R and $R_1$ can be the same or different and each is hydrogen or alkyl of 1 through 3 carbon atoms, or allyl; and X and Y are hydrogen, methyl, ethyl, chlorine, bromine, fluorine, trifluoromethyl, nitro, amino, monoalkylamino where the alkyl group has 1 through 4 and preferably 1 through 2 carbons, dialkylamino where each alkyl group has 1 through 4 and preferably 1 through 2 carbons, hydroxy, methoxy and ethoxy.

Also included within the scope of this invention are salts of the compounds of Formula 1. These salts have the following formula:

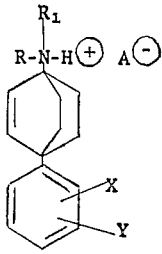

where R, $R_1$, X and Y have the same meaning as above.

In Formula 2 above A is a non-toxic anion derived from acids, representative of which are hydrochloric acid, sulfuric acid, phosphoric acid, acetic acid, succinic acid, adipic acid, propionic acid, tartaric acid, citric acid, and carbonic acid. The most preferred salts for purposes of the invention are those having anions derived from hydrochloric acid, acetic acid and succinic acid.

Compounds of the present invention are particularly outstanding where R and $R_1$ are hydrogen, X is hydrogen, and where Y is hydrogen or fluorine. Besides hydrogen or fluorine, it is preferred that Y be hydroxy, chlorine, trifluoromethyl or alkoxy.

The free amines of this invention are generally colorless, low-melting solids, soluble in organic solvents. They are moderately basic, comparing with the alkyl amines in this respect. The salts are usually colorless, high-melting, crystalline materials, sparingly soluble in water and insoluble in organic solvents.

The synthesis of the compounds of this invention starts with 4 - phenylbicyclo[2.2.2]oct - 2 - ene - 1 - carboxylic acid (for the preparation of 4-phenylbicyclo[2.2.2]oct-2-ene-1-amine) or a 4-(substituted phenyl)bicyclo[2.2.2]-oct-2-ene-1-carboxylic acid (for the preparation of the 4 - (substituted phenyl)bicyclo[2.2.2]oct - 2 - ene - 1-amines). The preparation of these compounds is disclosed in copending application S.N. 460,812, filed June 2, 1965.

These are converted to 4-phenyl or 4-(substituted phenyl)bicyclo[2.2.2]oct-2-ene-1-amines by a modified Curtius reaction (J. Weinstock, J. Org. Chem., 26, 3511 (1961)) in which a mixed anhydride of the acid is formed with ethyl chloroformate and then treated with sodium azide to form the acid azide. This is heated in toluene to cause rearrangement to the isocyanate, which is treated with methanol to form the methyl urethane. Hydrolysis of the urethane yields the 4-phenyl or 4-(substituted phenyl)bicyclo[2.2.2]oct-2-ene-1-amine.

The amino compounds can be alkylated directly with alkyl halides and base or dialkyl sulfates and base to form N-alkyl and N,N-dialkylamines. This is an excellent method for making N-allyl and N,N-diallyl compounds.

The Eschweiler-Clarke reaction with formic acid and formaldehyde is used to prepare N,N-dimethyl compounds or to prepare N-alkyl-N-methyl amines providing the N-alkyl amine is used as starting material.

Illustrative of the compounds of this invention are the following. Non-toxic salts of these compounds are of course also contemplated.

4-phenylbicyclo[2.2.2]oct-2-ene-1-amine
N-methyl-4-phenylbicyclo[2.2.2]oct-2-ene-1-amine
N,N-dimethyl-4-phenylbicyclo[2.2.2]oct-2-ene-1-amine
N-ethyl-4-phenylbicyclo[2.2.2]oct-2-ene-1-amine
N-ethyl-N-methyl-4-phenylbicyclo[2.2.2]oct-2-ene-1-amine
N,N-diethyl-4-phenylbicyclo[2.2.2]oct-2-ene-1-amine
N-propyl-4-phenylbicyclo[2.2.2]oct-2-ene-1-amine
N-allyl-4-phenylbicyclo[2.2.2]oct-2-ene-1-amine
N-methyl-N-propyl-4-phenylbicyclo[2.2.2]oct-2-ene-1-amine
N-methyl-N-isopropyl-4-phenylbicyclo[2.2.2]oct-2-ene-1-amine
N-isopropyl-4-phenylbicyclo[2.2.2]oct-2-ene-1-amine
N-ethyl-N-propyl-4-phenylbicyclo[2.2.2]oct-2-ene-1-amine
N-ethyl-N-isopropyl-4-phenylbicyclo[2.2.2]oct-2-ene-1-amine
N,N-dipropyl-4-phenylbicyclo[2.2.2]oct-2-ene-1-amine
N,N-diisopropyl-4-phenylbicyclo[2.2.2]oct-2-ene-1-amine
N,N-diallyl-4-phenylbicyclo[2.2.2]oct-2-ene-1-amine
4-o-tolylbicyclo[2.2.2]oct-2-ene-1-amine
4-m-tolylbicyclo[2.2.2]oct-2-ene-1-amine
4-p-tolylbicyclo[2.2.2]oct-2-ene-1-amine
4-p-ethylphenylbicyclo[2.2.2]oct-2-ene-1-amine
4-(2,4-dimethylphenyl)bicyclo[2.2.2]oct-2-ene-1-amine
4-(3,5-dimethylphenyl)bicyclo[2.2.2]oct-2-ene-1-amine
4-(2,6-dimethylphenyl)bicyclo[2.2.2]oct-2-ene-1-amine
4-(4-ethyl-2-methylphenyl)bicyclo[2.2.2]oct-2-ene-1-amine
4-(2,4-diethylphenyl)bicyclo[2.2.2]oct-2-ene-1-amine
4-p-fluorophenylbicyclo[2.2.2]oct-2-ene-1-amine 4-p-chlorophenylbicyclo[2.2.2]oct-2-ene-1-amine
4-p-bromophenylbicyclo[2.2.2]oct-2-ene-1-amine
4-o-chlorophenylbicyclo[2.2.2]oct-2-ene-1-amine
4-o-bromophenylbicyclo[2.2.2]oct-2-ene-1-amine
4-p-trifluoromethylphenylbicyclo[2.2.2]oct-2-ene-1-amine
4-o-trifluoromethylphenylbicyclo[2.2.2]oct-2-ene-1-amine
4-p-nitrophenylbicyclo[2.2.2]oct-2-ene-1-amine
4-p-aminophenylbicyclo[2.2.2]oct-2-ene-1-amine
4-m-aminophenylbicyclo[2.2.2]oct-2-ene-1-amine
4-o-aminophenylbicyclo[2.2.2]oct-2-ene-1-amine
4-(p-methylaminophenyl)bicyclo[2.2.2]oct-2-ene-1-amine
4-(o-butylaminophenyl)bicyclo[2.2.2]oct-2-ene-1-amine
4-(p-dimethylaminophenyl)bicyclo[2.2.2]oct-2-ene-1-amine
4-(m-di-sec-butylaminophenyl)bicyclo[2.2.2]oct-2-ene-1-amine
4-p-hydroxyphenylbicyclo[2.2.2]oct-2-ene-1-amine
4-p-methoxyphenylbicyclo[2.2.2]oct-2-ene-1-amine
4-p-ethoxyphenylbicyclo[2.2.2]oct-2-ene-1-amine
4-(2,4-difluorophenyl)bicyclo[2.2.2]oct-2-ene-1-amine
4-(2-chloro-4-fluorophenyl)bicyclo[2.2.2]oct-2-ene-1-amine
4-(4-fluoro-2-trifluoromethylphenyl)bicyclo[2.2.2]oct-2-ene-1-amine
4-(2,4-dimethoxyphenyl)bicyclo[2.2.2]oct-2-ene-1-amine
4-(3,4-dimethoxyphenyl)bicyclo[2.2.2]oct-2-ene-1-amine
4-(2,4-dinitrophenyl)bicyclo[2.2.2]oct-2-ene-1-amine
4-(2,4-dihydroxyphenyl)bicyclo[2.2.2]oct-2-ene-1-amine
4-(4-hydroxy-2-methylphenyl)bicyclo[2.2.2]oct-2-ene-1-amine
4-(2,3-diaminophenyl)bicyclo[2.2.2]oct-2-ene-1-amine
N-methyl-4-p-chlorophenylbicyclo[2.2.2]oct-2-ene-1-amine
N,N-dimethyl-4-p-chlorophenylbicyclo[2.2.2]oct-2-ene-1-amine
N-methyl-4-p-trifluoromethylphenylbicyclo[2.2.2]oct-2-ene-1-amine
N,N-dimethyl-4-p-trifluoromethylphenylbicyclo[2.2.2]oct-2-ene-1-amine
N-methyl-4-p-methoxyphenylbicyclo[2.2.2]oct-2-ene-1-amine
N,N-dimethyl-4-p-methoxyphenylbicyclo[2.2.2]oct-2-ene-1-amine
N-ethyl-4-(p-ethylamino)phenylbicyclo[2.2.2]oct-2-ene-1-amine Particularly preferred for their effectiveness and combination of desired properties are the following compounds and their salts, especially their hydrochlorides:

4-phenylbicyclo[2.2.2]oct-2-ene-1-amine
N-methyl-4-phenylbicyclo[2.2.2]oct-2-ene-1-amine
N-ethyl-4-phenylbicyclo[2.2.2]oct-2-ene-1-amine
4-p-methoxyphenylbicyclo[2.2.2]oct-2-ene-1-amine
4-p-trifluoromethylphenylbicyclo[2.2.2]oct-2-ene-1-amine
4-p-fluorophenylbicyclo[2.2.2]oct-2-ene-1-amine
4-p-hydroxyphenylbicyclo[2.2.2]oct-2-ene-1-amine
4-p-nitrophenylbicyclo[2.2.2]oct-2-ene-1-amine
4-(2,4-difluorophenyl)bicyclo[2.2.2]oct-2-ene-1-amine
4-(2,6-difluorophenyl)bicyclo[2.2.2]oct-2-ene-1-amine
4-p-tolylbicyclo[2.2.2]oct-2-ene-1-amine
4-(2,4-dimethylphenyl)bicyclo[2.2.2]oct-2-ene-1-amine This invention will be better understood by reference to the following illustrative examples in which parts and percentages are by weight unless otherwise indicated.

EXAMPLE 1

A solution of 16 ml. (11.6 g., 0.115 mole) of triethylamine in 100 ml. of acetone is added to a stirred mixture of 22.8 g. (0.10 mole) of 4-phenylbicyclo[2.2.2]oct-2-ene-1-carboxylic acid and 300 ml. of acetone. This solution is cooled to −5 to 0° C. and a solution of 12.0 g. (0.11 mole) of ethyl chloroformate in 50 ml. of acetone is added dropwise, with cooling, at a rate such that the temperature does not rise above 0° C. When the addition is complete, stirring is continued for 30 min., and then a solution of 9.8 g. (0.15 mole) of sodium azide in 30 ml. of water is added dropwise at −5 to 0° C. After addition is complete, stirring is continued for 1 hour. The cold solution is diluted with ice water and extracted with toluene. The toluene solution is dried with anhydrous magnesium sulfate, filtered, and heated on a steam bath until the evolution of nitrogen is complete. Then, 100 ml. of methanol and 0.5 g. of "Dabco" (1,4-diazabicyclo[2.2.2]octane) are added and the mixture is heated at reflux for 30 min. On cooling, the solution yields methyl N-4-phenylbicyclo[2.2.2]oct-2-en-1-yl urethane, M.P. 141.5–143° C.

The urethane is hydrolyzed by refluxing it with 500 ml. of 10% sodium hydroxide solution for 16 hours. The mixture is allowed to cool and then is extracted with ether. The ether extract is dried with anhydrous potassium carbonate and filtered. The ether solution is treated with anhydrous hydrogen chloride to give a precipitate, which is filtered, washed with ether, and dried. The precipitate is 4 - phenylbicyclo[2.2.2]oct - 2 - ene - 1 - amine hydrochloride, M.P. 327° C. (dec.).

*Analysis.*—Calc'd for $C_{14}H_{18}NCl$: N, 5.94. Found: N, 5.80.

EXAMPLES 2–31

Example 1 is repeated, substituting 0.10 mole of the indicated reactant for the 4-phenylbicyclo[2.2.2]oct-2-ene-1-carboxylic acid.

| Ex. | Reactant | Product |
| --- | --- | --- |
| 2 | 4-(p-tolyl)bicyclo[2.2.2]oct-2-ene-1-carboxylic acid. | 4-(p-tolyl)bicyclo[2.2.2]oct-2-ene-1-amine hydrochloride. |
| 3 | 4-(p-ethylphenyl)bicyclo[2.2.2]oct-2-ene-1-carboxylic acid. | 4-(p-ethylphenyl)bicyclo[2.2.2]oct-2-ene-1-amine hydrochloride. |
| 4 | 4-(p-fluorophenyl)bicyclo[2.2.2]oct-2-ene-1-carboxylic acid. | 4-(p-fluorophenyl)bicyclo[2.2.2]oct-2-ene-1-amine hydrochloride. |
| 5 | 4-(p-chlorophenyl)bicyclo[2.2.2]oct-2-ene-1-carboxylic acid. | 4-(p-chlorophenyl)bicyclo[2.2.2]oct-2-ene-1-amine hydrochloride. |
| 6 | 4-(p-bromophenyl)bicyclo[2.2.2]oct-2-ene-1-carboxylic acid. | 4-(p-bromophenyl)bicyclo[2.2.2]oct-2-ene-1-amine hydrochloride. |
| 7 | 4-(p-nitrophenyl)bicyclo[2.2.2]oct-2-ene-1-carboxylic acid. | 4-(p-nitrophenyl)bicyclo[2.2.2]oct-2-ene-1-amine hydrochloride. |
| 8 | 4-(p-cyanophenyl)bicyclo[2.2.2]oct-2-ene-1-carbocylic acid. | 4-(p-cyanophenyl)bicyclo[2.2.2]oct-2-ene-1-amine. |
| 9 | 4-(p-trifluoromethylphenyl)bicyclo[2.2.2]oct-2-ene-1-carboxylic acid. | 4-(p-trifluoromethylphenyl)bicyclo[2.2.2]oct-2-ene-1-amine hydrochloride. |
| 10 | 4-(p-methoxyphenyl)bicyclo[2.2.2]oct-2-ene-1-carboxylic acid. | 4-(p-methoxyphenyl)bicyclo[2.2.2]oct-2-ene-1-amine hydrochloride. |
| 11 | 4-(p-methoxycarbonylphenyl)-bicyclo[2.2.2]oct-2-ene-1-carboxylic acid. | 4-(p-methoxycarbonylphenyl)-bicyclo[2.2.2]oct-2-ene-1-amine hydrochloride. |
| 12 | 4-(p-ethoxycarbonylphenyl)-bicyclo[2.2.2]oct-2-ene-1-carboxylic acid. | 4-(p-ethoxycarbonylphenyl)-bicyclo[2.2.2]oct-2-ene-1-amine hydrochloride. |
| 13 | 4-(m-tolyl)bicyclo[2.2.2]oct-2-ene-1-carboxylic acid | 4-(m-tolyl)bicyclo[2.2.2]oct-2-ene-1-amine hydrochloride. |
| 14 | 4-(m-fluorophenyl)bicyclo[2.2.2]oct-2-ene-1-carboxylic acid | 4-(m-fluorophenyl)bicyclo[2.2.2]oct-2-ene-1-amine hydrochloride |
| 15 | 4-(m-chlorophenyl)bicyclo[2.2.2]oct-2-ene-1-carboxylic acid | 4-(m-chlorophenyl)bicyclo[2.2.2]oct-2-ene-1-amine hydrochloride |
| 16 | 4-(m-bromophenyl)bicyclo[2.2.2]oct-2-ene-1-carboxylic acid. | 4-(m-bromophenyl)bicyclo[2.2.2]oct-2-ene-1-amine hydrochloride. |
| 17 | 4-(m-nitrophenyl)bicyclo[2.2.2]oct-2-ene-1-carboxylic acid. | 4-(m-nitrophenyl)bicyclo[2.2.2]oct-2-ene-1-amine hydrochloride. |
| 18 | 4-(m-methoxyphenyl)bicyclo[2.2.2]oct-2-ene-1-carboxylic acid. | 4-(m-methoxyphenyl)bicyclo[2.2.2]oct-2-ene-1-amine hydrochloride. |
| 19 | 4-(m-methoxycarbonylphenyl)bicyclo[2.2.2]oct-2-ene-1-carboxylic acid. | 4-(m-methoxycarbonylphenyl)bicyclo[2.2.2]oct-2-ene-1-amine hydrochloride. |
| 20 | 4-(m-ethoxycarbonylphenyl)-bicyclo[2.2.2]oct-2-ene-1-carboxylic acid. | 4-(m-ethoxycarbonylphenyl)-bicyclo[2.2.2]oct-2-ene-1-amine hydrochloride. |
| 21 | 4-(m-trifluoromethylphenyl)-bicyclo[2.2.2]oct-2-ene-1-carboxylic acid. | 4-(m-trifluoromethylphenyl)-bicyclo[2.2.2]oct-2-ene-1-amine hydrochloride. |

| Ex. | Reactant | Product |
| --- | --- | --- |
| 22 | 4-(o-tolyl)bicyclo[2.2.2]-oct-2-ene-1-carboxylic acid. | 4-(o-tolyl)bicyclo[2.2.2]-oct-2-ene-1-amine hydrochloride. |
| 23 | 4-(o-fluorophenyl)bicyclo-[2.2.2]oct-2-ene-1-carboxylic acid. | 4-(o-fluorophenyl)bicyclo-[2.2.2]oct-2-ene-1-amine hydrochloride. |
| 24 | 4-(o-chlorophenyl)bicyclo-[2.2.2]oct-2-ene-1-carboxylic acid. | 4-(o-chlorophenyl)bicyclo-[2.2.2]oct-2-ene-1-amine hydrochloride. |
| 25 | 4-(o-bromophenyl)bicyclo-[2.2.2]oct-2-ene-1-carboxylic acid. | 4-(o-bromophenyl)bicyclo-[2.2.2]oct-2-ene-1-amine hydrochloride. |
| 26 | 4-(o-nitrophenyl)bicyclo-[2.2.2]oct-2-ene-1-carboxylic acid. | 4-(o-nitrophenyl)bicyclo-[2.2.2]oct-2-ene-1-amine hydrochloride. |
| 27 | 4-(2,4-dimethylphenyl)bicyclo[2.2.2]oct-2-ene-1-carboxylic acid. | 4-(2,4-dimethylphenyl)bicyclo[2.2.2]oct-2-ene-1-amine hydrochloride. |
| 28 | 4-(3,5-dimethylphenyl)-bicyclo[2.2.2]oct-2-ene-1-carboxylic acid. | 4-(3,5-dimethylphenyl)-bicyclo[2.2.2]oct-2-ene-1-amine hydrochloride. |
| 29 | 4-(3,4-dimethoxyphenyl)bicyclo[2.2.2]oct-2-ene-1-carboxylic acid. | 4-(3,4-dimethoxyphenyl)-bicyclo[2.2.2]oct-2-ene-1-amine hydrochloric. |
| 30 | 4-(3-bromo-4-methoxyphenyl)-bicyclo[2.2.2]oct-2-ene-1-carboxylic acid. | 4-(3-bromo-4-methoxyphenyl)bicyclo[2.2.2]oct-2-ene-1-amine hydrochloride. |
| 31 | 4-(3-nitro-4-methoxyphenyl)-bicyclo[2.2.2]oct-2-ene-1-carboxylic acid. | 4-(3-nitro-4-methoxyphenyl)-bicyclo[2.2.2]oct-2-ene-1-amine hydrochloride. |

EXAMPLE 32

One mole of 4-(p-nitrophenyl)bicyclo[2.2.2]oct-2-ene-1-amine hydrochloride (Example 7) is suspended in 1000 ml. of water, and made basic with 50% sodium hydroxide (cooling is required). The mixture is extracted with three 200-ml. portions of ether, and the ether extracts are combined and dried with potassium hydroxide pellets. The ether is removed by vacuum evaporation to give a residue of 4-(p-nitrophenyl)bicyclo[2.2.2]oct-2-ene-1-amine.

Raney nickel catalyst (W–6) is added to a solution of 0.010 mole of 4-(p-nitrophenyl)bicyclo[2.2.2]oct-2-ene-1-amine and 2 ml. of hydrazine hydrate in 100 ml. of ethanol at 70° C. until evolution of gas commences. The mixture is heated at reflux for 30 min. and is cooled. The catalyst is filtered, and the filtrate is evaporated in a vacuum. The residue is dissolved in ether, and anhydrous hydrogen chloride is passed into the solution until precipitation is complete. The precipitate of 4-(p-aminophenyl)bicyclo[2.2.2]oct-2-ene-1-amine dihydrochloride is filtered, washed with ether and dried.

EXAMPLES 33–35

Example 32 is repeated, substituting 0.010 mole of the indicated reactant for the 4-(p-nitrophenyl)bicyclo[2.2.2]-oct-2-ene-1-amine.

| Ex. | Reactant | Product |
| --- | --- | --- |
| 33 | 4-(m-nitrophenyl)bicyclo-[2.2.2]oct-2-ene-1-amine (Example 17). | 4-(m-aminophenyl)bicyclo-[2.2.2]oct-2-ene-1-amine dihydrochloride. |
| 34 | 4-(o-nitrophenyl)bicyclo-[2.2.2]oct-2-ene-1-amine (Example 26). | 4-(o-aminophenyl)bicyclo-[2.2.2]oct-2-ene-1-amine dihydrochloride. |
| 35 | 4-(3-nitro-4-methoxyphenyl)-bicyclo[2.2.2]oct-2-ene-1-amine (Example 31). | 4-(3-amino-4-methoxyphenyl)-bicyclo[2.2.2]oct-2-ene-1-amine dihydrochloride. |

EXAMPLE 36

A 4.0 g. (0.10 mole) amount of sodium hydroxide is added to a solution of 0.10 mole of 4-(p-methoxycarbonylphenyl)bicyclo[2.2.2]oct - 2-ene-1-amine (Example 11) in 200 ml. of ethanol. The mixture is heated at reflux for 24 hours, cooled, and then the solvent is removed by vacuum evaporation. The residue is stirred with 200 ml. of water and 6.0 g. (0.10 mole) of glacial acetic acid is added. The mixture is stirred for 30 minutes and the product, 4-(p-carboxyphenyl)bicyclo[2.2.2]oct-2-ene-1-amine, is filtered and dried.

Substitution of 0.10 mole of 4-(p-ethoxycarbonylphenyl)bicyclo[2.2.2]oct-2-ene-1-amine (Example 12) for the 0.10 mole of 4-(p-methoxycarbonylphenyl)bicyclo[2.2.2]oct-2-ene-1-amine gives the same product.

EXAMPLE 37

Example 36 is repeated, substituting 0.10 mole of 4-(m-methoxycarbonylphenyl)bicyclo[2.2.2]oct - 2 - ene-1-amine (Example 19) or 4-(m-ethoxycarbonylphenyl)bicyclo[2.2.2]oct-2-ene-1-amine (Example 20) for the 0.10 mole of 4-(p-methoxycarbonylphenyl)bicyclo[2.2.2]oct-2-ene-1-amine. The product is 4-(m-carboxyphenyl)bicyclo[2.2.2]oct-2-ene-1-amine.

EXAMPLE 38

In a nitrogen atmosphere, 0.050 mole of 4-(p-methoxyphenyl)bicyclo[2.2.2]oct-2-ene-1-amine (Example 10) is boiled for 3 hours with a mixture of 12 g. of red phosphorus, 30 ml. of acetic anhydride and 30 ml. of concentrated (57%) hydriodic acid. The phosphorus is filtered and washed with 10 ml. of 50% acetic acid. The combined filtrates are evaporated at reduced pressure and the residue is stirred with water and made alkaline with 3 N ammonium hydroxide. The precipitate which separates is filtered, washed with water, and then stirred with 100 ml. of 1 N hydrochloric acid. The solution is vacuum-evaporated to give a residue consisting of 4-(p-hydroxyphenyl)bicyclo[2.2.2]oct-2-ene-1-amine hydrochloride.

EXAMPLE 39

Example 38 is repeated, substituting 0.050 mole of 4-(m-methoxyphenyl)bicyclo[2.2.2]oct-2-ene - 1 - amine (Example 18) for the 0.050 mole of 4-(p-methoxyphenyl)bicyclo[2.2.2]oct-2-ene-1-amine. The product is 4-(m-hydroxyphenyl)bicyclo[2.2.2]oct-2-ene - 1 - amine hydrochloride.

EXAMPLE 40

A mixture of 0.03 mole of 4-phenylbicyclo[2.2.2]oct-2-ene-1-amine (Example 1), 8 ml. of 98% formic acid and 5 ml. of 37% aqueous formaldehyde is heated at reflux on a steam bath for 15 hours. The mixture is cooled, 50 ml. of water and 25 ml. of 50% sodium hydroxide are added, with cooling, and it is extracted with three 25-ml. portions of ether. The ether extracts are combined, dried with potassium hydroxide pellets, and then treated with dry hydrogen chloride gas until precipitation is complete. The N,N-dimethyl-4-phenylbicyclo[2.2.2]oct-2-ene-1-amine hydrochloride is filtered and dried. More of this product can be obtained by evaporating the filtrate to dryness.

EXAMPLE 41

A mixture of 0.10 mole of 4-phenylbicyclo[2.2.2]oct-2-ene-1-amine (Example 1) and 50 ml. of butyl formate is heated at reflux for 16 hours, then cooled. The excess butyl formate and butanol are removed by vacuum evaporation to yield a residue of 1-formamido-4-phenylbicyclo[2.2.2]oct-2-ene.

A solution of 0.10 mole of 1-formamido-4-phenyl-bicyclo[2.2.2]oct-2-ene in 200 ml. of anhydrous dimethyl formamide is stirred as 0.10 mole of sodium hydride is added. After hydrogen evolution ceases, 0.10 mole of propyl bromide is added slowly. The mixture is stirred at room temperature for 10 hours, and then poured into water. This mixture is made strongly basic with 50% sodium hydroxide, and extracted with three 100-ml. portions of ethyl ether. The ether extracts are combined, dried with potassium hydroxide pellets, and the ether is removed by vacuum evaporation to yield N-propyl-4-phenylbicyclo[2.2.2]oct-2-ene-1-amine. This is purified by vacuum distillation.

EXAMPLE 42

A solution of 0.10 mole of 1-formamido-4-phenylbicyclo[2.2.2]oct-2-ene (Example 41) in 200 ml. of anhydrous dimethyl formamide is stirred as 0.10 mole of sodium hydride is added. After hydrogen evolution ceases, 0.10 mole of allyl bromide is added slowly. The mixture is stirred at room temperature for 10 hours, and then poured into water. This mixture is made strongly basic with 50% sodium hydroxide, and extracted with three 100-ml. portions of ethyl ether. The ether extracts are combined, dried with potassium hydroxide pellets, and the ether is removed by vacuum evaporation to yield N-allyl-4-phenylbicyclo[2.2.2]oct-2-ene-1-amine. This is purified by vacuum distillation.

EXAMPLES 43–46

In addition to the hydrochloride salts prepared as described above, other salts are prepared by combining equal molar amounts of the free base and an acid in water and then removing the water by evaporation. The following lists these non-limiting examples.

| Ex. | Free Base of Example | Acid | Product |
|---|---|---|---|
| 43 | 2 | Acetic | 4-(p-tolyl)bicyclo[2.2.2]oct-2-ene-1-amine acetate. |
| 44 | 14 | Sulfuric | 4-(m-fluorophenyl)bicyclo-[2.2.2]-oct-2-ene-1-amine sulfate. |
| 45 | 29 | Phosphoric | 4-(3,4-dimethoxyphenyl)-bicyclo[2.2.2]oct-2-ene-1-amine phosphate. |
| 46 | 38 | Lactic | 4-(p-hydroxyphenyl)bicyclo-[2.2.2]oct-2-ene-1-amine lactate. |

The preceding examples can be repeated substituting equivalent amounts of appropriate starting materials to obtain other compounds of this invention including those listed hereinbefore.

The compounds of this invention can be administered for antidepressant effect according to this invention by any suitable means. For example, administration can be parenterally, that is subcutaneously, intravenously, intramuscularly, or intraperitoneally. Alternatively or concurrently, administration can be by the oral route.

Ordinarily, from 0.1 to 5 and preferably 0.1 to 2 mg./kg. per day, in one or more applications per day, is effective to obtain the desired result.

The active ingredient of this invention can be employed in useful compositions according to the present invention in such dosage forms as tablets, capsules, powder packets, or liquid solutions, suspensions, or elixirs, for oral administration or liquid solutions for parenteral use, and in certain cases, suspensions for parenteral use (except intravenous). In such compositions the active ingredient will ordinarily always be present in an amount of at least 0.02% by weight based on the total weight of the composition and not more than 99% by weight.

Besides the active ingredient of this invention the composition will contain a solid or liquid non-toxic pharmaceutical carrier for the active ingredient.

In one embodiment of a pharmaceutical composition of this invention, the solid carrier is a capsule which can be of the ordinary gelatin type. In the capsule will be from about 1–50% by weight of a compound of Formula 1 or 2 and 99–50% of a carrier. In another embodiment, the active ingredient is tableted with or without adjuvants. In yet another embodiment, the active ingredient is put into powder packets and employed. These capsules, tablets and powders will generally constitute from about 1% to about 95% and preferably from 1% to 50% by weight. These dosage forms preferably contain from about 1 to about 500 mg. of active ingredient, with from about 1 to about 100 most preferred.

The pharmaceutical carrier can, as previously indicated, to be a sterile liquid such as water and oils, including those of petroleum, animal, vegetable or synthetic origin, for example peanut oil, soybean oil, mineral oil, sesame oil, and the like. In general, water, saline, aqueous dextrose (glucose) and related sugar solutions and glycols such as propylene glycol or polyethylene glycols are preferred liquid carriers, particularly for injectable solutions. Sterile injectable solutions such as saline will ordinarily contain from about 0.05% to 10%, and preferably about 0.1 to 1% by weight of the active ingredient.

As mentioned above, oral administration can be in a suitable suspension or syrup, in which the active ingredient ordinarily will constitute from about 0.02 to 10%, and preferably about 0.1 to 1% by weight. The pharmaceutical carrier in such composition can be a watery vehicle such as an aromatic water, a syrup or a pharmaceutical mucilage.

Suitable pharmaceutical carriers are described in "Remington's Practice of Pharmacy" by E. W. Martin and E. F. Cook, a well known reference text in this field.

In addition to the exemplary illustrations above, the following examples further explain one aspect of the present invention:

EXAMPLE 47

A large number of unit capsules are prepared for oral administration by filling standard two-piece hard gelatin capsules weighing about 30 mg. each with 5 mg. of powdered 4-phenylbicyclo[2.2.2]oct-2-ene-1-amine, hydrochloride, 100 mg. of lactose and 0.2 mg. of "Cab-o-sil" finely divided silica.

EXAMPLE 48

A large number of unit capsules are prepared for oral administration by filling soft gelatin capsules with a solution of 4-phenylbicyclo[2.2.2]oct-2-ene-1-amine in mineral oil.

EXAMPLE 49

Example 47 is repeated except that the dosage unit is 5 mg. of active ingredient, 5 mg. of gelatin, 3 mg. of magnesium stearate and 100 mg. of mannitol, mixed and formed into a tablet by a conventional tableting machine. Slow release pills or tablets can also be used, by applying appropriate coatings.

EXAMPLE 50

A parenteral composition suitable for administration by injection is prepared by stirring 0.5% by weight of the active ingredient of Example 32 in sterile aqueous 0.9% saline.

A large variety of compositions according to this invention can thus readily be made by substituting other compounds of this invention, and including specifically but not limited to compounds of this invention that have specifically been named hereinbefore. The compounds will be used in the amounts indicated in accordance with procedures well known and described in the Martin and Cook text mentioned above.

The above and similar examples can be carried out in accordance with the teachings of this invention, as will be readily understood by persons skilled in the art, by substitution of components and amounts in place of those specified. Thus, the foregoing detailed description has been given for clearness of understanding only and no unnecessary limitations are to be understood therefrom.

The invention claimed is:
1. A compound selected from the group consisting of:
(a) compounds of the formula

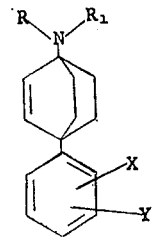

where:
R and $R_1$ are selected from the group consisting of hydrogen, alkyl of 1 through 3 carbon atoms or allyl; and
X and Y are selected from the group consisting of hydrogen, methyl, ethyl, chlorine, bromine, fluorine, trifluoromethyl, nitro, amino, monoalkylamino wherein the alkyl group has 1 through 4 carbon atoms, dialkyl amino where alkyl group has 1 through 4 carbon atoms, hydroxy, methoxy, and ethoxy; and
(b) non-toxic salts of the compounds of (a).

2. A compound of claim 1 wherein R, $R_1$, X and Y are each hydrogen.

3. A compound of claim 1 wherein R, $R_1$ and X are each hydrogen and Y is fluorine.

4. A compound of claim 1 wherein R, $R_1$ and X are each hydrogen and Y is hydroxy.

5. A compound of claim 1 wherein R, $R_1$ and X are hydrogen and Y is chlorine.

6. A compound of claim 1 wherein R, $R_1$ and X are hydrogen and Y is trifluoromethyl.

7. A compound of claim 1 wherein R, $R_1$ and X are hydrogen and Y is alkoxy.

8. 4-phenylbicyclo[2.2.2]oct-2-ene-1-amine.

9. 4-phenylbicyclo[2.2.2]oct-2-ene-1-amine hydrochloride.

References Cited
UNITED STATES PATENTS 3,308,160  3/1967  Snyder _____ 260—570.5

CHARLES B. PARKER, *Primary Examiner.*

R. V. HINES, *Assistant Examiner.*